(12) United States Patent
Albada et al.

(10) Patent No.: US 12,540,824 B2
(45) Date of Patent: Feb. 3, 2026

(54) DYNAMIC PICKUP POINT RE-RANKING SYSTEM

(71) Applicant: Uber Technologies, Inc., San Francisco, CA (US)

(72) Inventors: Michael Charles Albada, San Francisco, CA (US); Miles Lucas Detrixhe, San Francisco, CA (US); Daniel Patrick Iland, Oakland, CA (US); Saebra Lynn Waterstraut, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 693 days.

(21) Appl. No.: 17/305,911

(22) Filed: Jul. 16, 2021

(65) Prior Publication Data

US 2022/0020106 A1  Jan. 20, 2022

Related U.S. Application Data

(60) Provisional application No. 62/705,820, filed on Jul. 16, 2020.

(51) Int. Cl.
*G01C 21/34* (2006.01)
*G06Q 10/02* (2012.01)
*G06Q 10/047* (2023.01)
*G06Q 50/40* (2024.01)

(52) U.S. Cl.
CPC ......... *G01C 21/3415* (2013.01); *G06Q 10/02* (2013.01); *G06Q 10/047* (2013.01); *G06Q 50/40* (2024.01)

(58) Field of Classification Search
CPC ...... G06Q 50/40; G06Q 10/02; G06Q 10/047; G01C 21/3415; G01C 21/3438
See application file for complete search history.

(56) References Cited

U.S. PATENT DOCUMENTS

| | | | |
|---|---|---|---|
| 9,852,551 B2 * | 12/2017 | Brinig | G01S 5/0027 |
| 9,857,188 B1 * | 1/2018 | O'Hare | G01C 21/3415 |
| 10,508,925 B2 * | 12/2019 | Badalamenti | G01C 21/3647 |
| 2006/0059023 A1 * | 3/2006 | Mashinsky | G06Q 10/02 |
| | | | 705/5 |

(Continued)

*Primary Examiner* — Donald J Wallace
(74) *Attorney, Agent, or Firm* — Schwegman Lundberg & Woessner, P.A.

(57) ABSTRACT

Systems and methods for dynamically re-ranking a pickup point are provided. The system receives a request for transportation service from a device of a rider that includes a selected pickup point. In response, the system establishes the transportation service including assigning a driver. Based on detecting that the transportation service is in a pre-pickup state, the system performs a re-rank analysis. The re-rank analysis determines whether an alternative pickup point exceeds the selected pickup point on an objective function by more than a predetermined threshold. The determining is based on a last known location of the rider, a last known location of the driver, and a predicted driver routeline. Responsive to the alternative pickup point exceeding the selected pickup point on the objective function by more than the predetermined threshold, the system causes presentation, on a device of the rider, of a suggestion to change to the alternative pickup point.

20 Claims, 8 Drawing Sheets

(56) References Cited

U.S. PATENT DOCUMENTS

| | | | |
|---|---|---|---|
| 2018/0058863 A1* | 3/2018 | Meyer | G01C 21/3415 |
| 2018/0202821 A1* | 7/2018 | Yu | G01C 21/3423 |
| 2018/0357907 A1* | 12/2018 | Reiley | G08G 1/005 |
| 2019/0146508 A1* | 5/2019 | Dean | G05D 1/0285 |
| | | | 701/26 |
| 2020/0240804 A1* | 7/2020 | Rao | G01C 21/3438 |
| 2020/0273333 A1* | 8/2020 | Elshenawy | G05D 1/81 |
| 2020/0408538 A1* | 12/2020 | Raju | G01C 21/3691 |

* cited by examiner

DYNAMIC PICKUP POINT RE-RANKING SYSTEM

CLAIM FOR PRIORITY

This application claims the benefit of priority of U.S. Application Ser. No. 62/705,820, filed Jul. 16, 2020, which is hereby incorporated by reference in its entirety.

TECHNICAL FIELD

The subject matter disclosed herein generally relates to managing a pickup point. Specifically, the present disclosure addresses systems and methods that dynamically re-rank pickup points based on rider and driver locations.

BACKGROUND

Generally, riders have a lot of flexibility in setting a pickup location in a ride-sharing transportation service. This may result in a wide variance of quality pickup experiences and is subject to many shortcomings. Typically, conventional systems attempt to set a precise pickup location too early in a user experience, and thus, cannot consider real-time data in establishing the pickup point.

BRIEF DESCRIPTION OF THE DRAWINGS

Some embodiments are illustrated by way of example and not limitation in the figures of the accompanying drawings.

DETAILED DESCRIPTION

Figure 1:
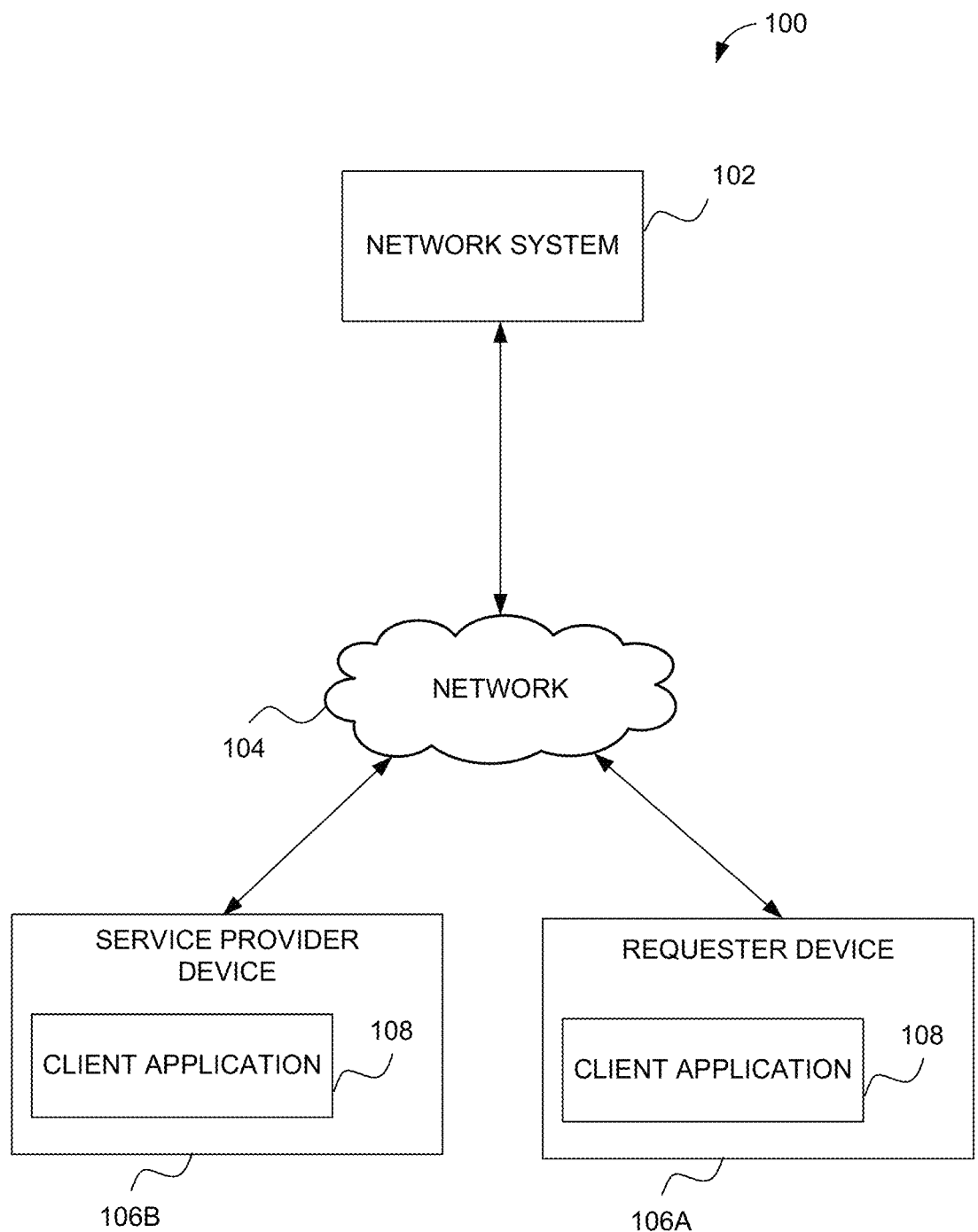
FIG. 1 is a diagram illustrating a network environment suitable for dynamically re-ranking pickup points, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Pickups are likely the most intractable problem for all ride-sharing companies. Typically, a pickup point or location is selected/fixed before a transportation request is received by a transportation system and is usually based on proximity of a user making a transportation request (also referred to as a "rider") at the time of the request. However, the pickup point may be far from where the rider is at and there may be noise in the system. For example, the rider may have placed the transportation request while inside a large complex (e.g., airport, mall) and the pickup location is located outside some distance from where the transportation request was made. More experienced riders may take more care in selecting and communicating their pickup location, but this increases the amount of work required of these more committed riders.

Example embodiments use information after the transportation request is made and assigned to a driver to continually assess whether a previously-selected pickup point is the right location for the pickup. In alterative embodiments, the assessment may be triggered by an event (e.g., rider is at a wrong location, driver made a wrong turn). If the previously-selected pickup point is not the best pickup location, example embodiments will recommend an alternative pickup point. In various embodiments, the best pickup location may be one that has a shorter estimated time of arrival (ETA) for the driver, a lowest cost, or some other advantage (e.g., avoids traffic, less congested pickup location).

As an example, GPS may be noisy when the user makes the transportation request, and subsequent user location data is better or more accurate. Additionally, the driver location and predicted driver route can impact the best pickup point especially in an area where there are one-way streets. Example embodiments may suggest that the rider move to a different street or move closer or farther from that one-way street in order to improve on ETA for pickup (e.g., provide a faster routeline to the pickup point) or to the destination (e.g., less traffic or one-way streets after pickup). Thus, by considering the current locations of the rider and driver along with a predicted driver routeline, example embodiments can re-rank pickup points to reduce, for example, ETA for the driver to the pickup location or to the destination.

The present disclosure provides technical solutions for dynamically re-ranking a pickup point based on last known locations of both the rider and driver along with a predicted driver routeline (e.g., navigation path) of the driver. The predicted driver routeline may be a route sent to the driver to navigate them from where they currently are to the pickup point. In example embodiments, the re-ranking is based on an objective function applied to a set of candidate pickup points located within a distance threshold to the last known rider location. The objective function is also applied to a previously-selected pickup point to determine whether the previously-selected pickup point or a top-ranked candidate pickup point is a better pickup location for both the rider and the driver. If the top-ranked candidate pickup point is better (e.g., lower ETA for the driver), example embodiments will present an option to the rider to change the pickup point to the top-ranked candidate pickup point.

FIG. 1 is a diagram illustrating a network environment 100 suitable for dynamically re-ranking pickup points in accordance with example embodiments. The network environment 100 includes a network system 102 communicatively coupled via a network 104 to a requester device 106a of a rider and a service provider device 106b of a driver (collectively referred to as "user devices 106"). In example embodiments, the network system 102 comprises components that obtain, store, and analyze data received from the user devices 106 in order to determine optimal pickup points or locations. More particularly, the network system 102 performs re-ranking of pickup locations based on real-time data obtained from the user devices 106 and a predicted routeline of the driver to determine if a better pickup point should be presented to the rider. The components of the network system 102 are described in more detail in connection with FIG. 2A and FIG. 2B and may be implemented in a computer system, as described below with respect to FIG. 6.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the user devices 106 are portable electronic devices such as smartphones, tablet devices, wearable computing devices (e.g., smartwatches), or similar devices. Alternatively, the service provider device 106b can correspond to an on-board computing system of a vehicle. The user devices 106 each comprises one or more processors, memory, touch screen displays, wireless networking system (e.g., IEEE 802.11), cellular telephony support (e.g., LTE/GSM/UMTS/CDMA/HSDP A), and/or location determination capabilities.

The user devices 106 interact with the network system 102 through a client application 108 stored thereon. The client application 108 of the user devices 106 allow for exchange of information with the network system 102 via user interfaces, as well as in background. For example, the client application 108 running on the user devices 106 may determine and/or provide location information of the user devices 106 (e.g., current location in latitude and longitude), via the network 104, for storage and analysis. In example embodiments, the location information is used by the network system 102 to determine whether an alternative pickup point is a better location for the rider to rendezvous with the driver.

In example embodiments, a first user (e.g., a requester or rider) operates the requester device 106a that executes the client application 108 to communicate with the network system 102 to make a request for a transportation service such as transport or delivery service (referred to collectively as a "trip"). In some embodiments, the client application 108 determines or allows the first user to specify/select a pickup location (e.g., of the user or an item to be delivered) and to specify a drop-off location or destination for the trip. The client application 108 also presents information, from the network system 102 via user interfaces, to the user of the requester device 106a. For instance, the user interface can display a notification from the network system 102 that indicates that an alternative pickup location is a better location to meet the driver.

A second user (e.g., a service provider or driver) operates the service provider device 106b to execute the client application 108 that communicates with the network system 102 to exchange information associated with providing transportation service (e.g., to the user of the requester device 106a). The client application 108 presents information via user interfaces to the user of the service provider device 106b, such as invitations to provide the transportation service, navigation instructions (e.g., a routeline to a pickup point), and pickup and drop-off locations of people or items to be transported. The client application 108 also provides data to the network system 102 such as a current location (e.g., coordinates such as latitude and longitude), speed, and/or heading of the service provider device 106b or vehicle.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of user devices 106 may be embodied within the network environment 100. Furthermore, some components or functions of the network environment 100 may be combined or located elsewhere in the network environment 100. For example, some of the functions of the networked system 102 may be embodied within other systems or devices of the network environment 100. Additionally, some of the functions of the user device 106 may be embodied within the network system 102. While only a single network system 102 is shown, alternative embodiments may contemplate having more than one network system 102 to perform server operations discussed herein for the network system 102.

Figure 2A:
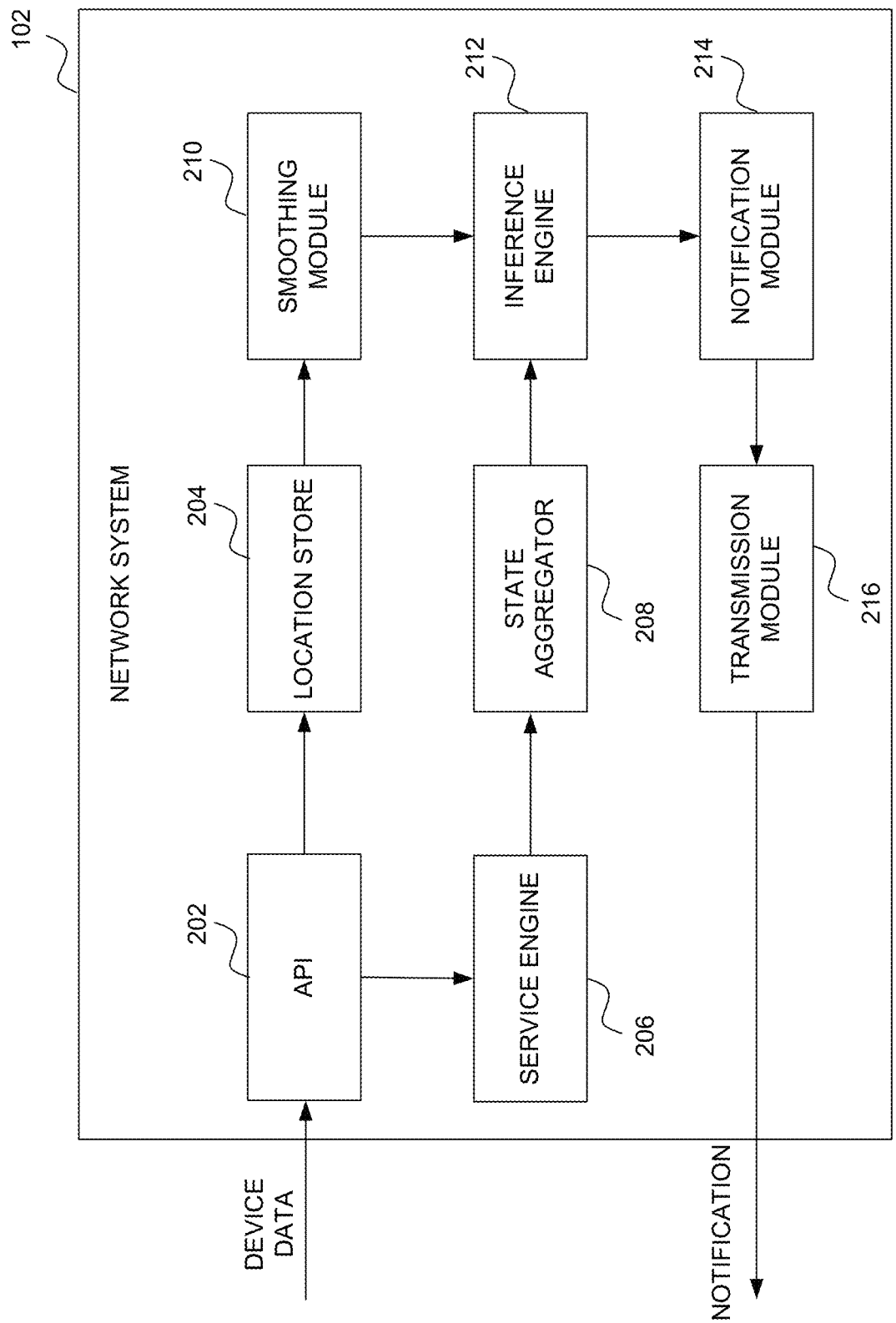
FIG. 2A is a block diagram illustrating components of a network system for dynamically re-ranking the pickup points, according to some example embodiments.

FIG. 2A is a block diagram illustrating components of the network system 102, according to some example embodiments. In various embodiments, the network system 102 obtains and stores trip data (e.g., locations of user devices, speed, direction) received from the user devices 106 and analyzes the trip data to determine whether an alternative pickup location selected from one or more candidate pickup locations may be more convenient for both the rider and driver. In example embodiments, the candidate pickup locations comprise typical or popular pickup locations (e.g., also referred to as "hotspots") based on historical trip data. To enable these operations, the network system 102 comprises an application programming interface (API) 202, a location store 204, a service engine 206, a state aggregator 208, an optional smoothing module 210, an inference engine 212, a notification module 214, and a transmission module 216 all configured to communicate with each other (e.g., via a bus, shared memory, or a switch). The network system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The API 202 is a real-time API configured to receive device data from the user devices 106. Accordingly, the API 202 receives location information (e.g., latitude and longitude) from the requester device 106a along with a transportation request. The transportation request includes an initial pickup point selected by the rider. Post request, while the rider is waiting for pickup, the API 202 receives location updates and other information from sensors of the requester device 106a. The location updates may indicate that the rider is at the pickup point, walking to the pickup point, is in a wrong location (e.g., not at the pickup point), or heading away from the pickup point.

Post request, the API 202 also receives location information from the service provider device 106b of the service provider or driver assigned to provide the transportation service. The location information from the driver indicates a current or last known location of the driver. Speed and direction of the driver can also be received or inferred from the location information.

The API 202 forwards the location information to the location store 204. The location store 204 comprises a data storage that contains the rider and driver locations at any given time (e.g., the location information may be time-stamped). In example embodiments, the location store 204 also stores or has access to a current routeline of the driver. In one embodiment, the routeline may be received from a navigation system (not shown) associated with the service engine 206. The navigation system determines a route (or routeline) from a current location of the driver to the assigned pickup point. The route is provided to the service provider device 106b as navigation instructions.

In example embodiments, the API 202 forwards the transportation request to the service engine 206. The service engine 206 manages the transportation service at the network system 102. In example embodiments, the service engine 206 receives the transportation request, creates a transportation job (e.g., a contract between the rider and driver), identifies and assigns a service provider to each job, and monitors progress of each job (e.g., in-progress, completed). As such, the service engine 206 can identify a current state for every job. In example embodiments, the states include created, assigned (to a driver), pickup completed, in-route, and trip completed.

The current state of each job is provided by the service engine 206 to the state aggregator 208. The state aggregator 208 maintains the states of the riders, drivers, and trips. Therefore, the state aggregator 208 knows what is going on with each particular trip at a given time.

The smoothing module 210 is configured to improve the location information accessed from the location store 204. In example embodiments, the smoothing module 210 applies an algorithm to remove noise from the location information. Any type of smoothing algorithm may be used such as, for example, the random method, random walk, moving average, simple exponential, linear exponential, simple Kalman Filter, Extended Kalman Filter, Unscented Kalman Filter, Adaptive Kalman Filter, or Kalman-Bucy Filter. In various embodiment, the smoothing module 210 may be optional.

After smoothing (or instead of smoothing), the location information including the routeline is accessed (e.g., transmitted or retrieved) by the inference engine 212. The inference engine 212 also accesses (e.g., obtains or retrieves) the current state of the trip from the state aggregator 208. Assuming the trip state indicates that the trip is in a pre-pickup state (e.g., before the rider is picked up), the inference engine 212 performs an analysis, in real time, to determine whether the rider is in a correct location for pickup and/or whether an alternative pickup location that is optimized based on the rider location, predicted rider walking time to the pickup location, driver location, and driver routeline should be presented to the rider. In one embodiment, the inference engine 212 performs the analysis continuously. In one case, continuous analysis is based on location upload time (e.g., approximately 4 seconds). Alternatively, the inference engine 212 can perform the analysis based on a location update (e.g., a new rider or driver location received by the API 202) or based on another event (e.g., detection of deviation from the predicted driver routeline).

When the driver deviates from the predicted driver routeline, a new predicted driver routeline is generated (e.g., by the navigation system of the service engine 206). The new predicted driver routeline may cause an ETA to the pickup point (or transportation cost) to be adversely affected. In such a case, the inference engine 212 may be triggered to perform the re-ranking analysis.

In another scenario, the driver may have missed the rider (e.g., drove past and could not stop). In this case, the service engine 206 creates a new driver routeline for the driver and may trigger the inference engine 212 to perform the re-ranking analysis to find a potentially better pickup point in the immediate vicinity of the rider that has a lower ETA for the driver to the pickup point.

In example embodiments, the inference engine 212 accesses (e.g., retrieves, receives, fetches) a last known rider location and driver location and the last known predicted driver routeline (e.g., from the location store 204, the smoothing module 210, or the service engine 206 via the state aggregator 208). The inference engine 212 also accesses a set of candidate pickup points or hotspots. In some embodiments, the set of candidate pickup points is determined or obtained by making a call to a component (not shown) that stores frequently-used pickup points based on clustering the start location of large volumes of historical trip data. The call includes the last known location of the rider and a request for the set of candidate pickup points within a distance threshold of the last known location of the rider.

Once the inference engine 212 has the last known rider and driver locations, predicted driver routeline, and set of candidate pickup points, the inference engine 212 performs re-ranking analysis by applying an objective function. The simplest form uses ETA improvement as the sole quality measure. In various embodiments, the objective function ranks across rider and driver distance and estimated time of arrival (ETA) from the latest known rider and driver location to each candidate pickup point in the set. The objective function is a weighted combination that equates to 1 of the form $\Sigma_{i=1}^{n} w_i q_i$ where $\Sigma_{i=1}^{n} w_i = 1$ and i indexes each of n quality measures for a specific pickup point candidate and the given context of the current pickup point, rider location, driver location, and driver routeline. Example quality metrics or measures include the scaled rider distance to the pickup point, the scaled driver distance to the pickup point, the distance between the candidate and current pickup points, the relative and absolute ETA savings for the pickup point candidate relative to the current point, and, in cases where the rider has moved since they requested a trip, whether the candidate point is in the same direction of their motion or would require them to backtrack.

In one example, the objective function is based on 80% last known rider location, 10% last known driver location, and 10% predicted driver routeline. However, alternatively embodiments can use other combinations of percentages for the objective function. Thus, the objective function is a weighted function of the last known rider location, last known driver location, and predicted driver routeline. The inference engine 212 then selects the top-ranking candidate pickup point.

In example embodiments, the inference engine 212 also applies the same objective function to the current pickup point (i.e., the previously-selected pickup point). The inference engine 212 then compares the result of the objective function of the current pickup point to the selected candidate pickup point. The objective function is scaled to between 0.0 and 1.0. If the result of the selected candidate pickup point exceeds the previously-selected pickup point on both an absolute and relative basis by more than a predetermined threshold, such as a 5% relative improvement and 10 basis points absolute improvement, then the inference engine 212 triggers the notification module 214 to generate a notification indicating the option for selecting an alternative pickup point. The notification is then transmitted (e.g., pushed) to the requester device 106a by the transmission module 216.

Figure 2B:
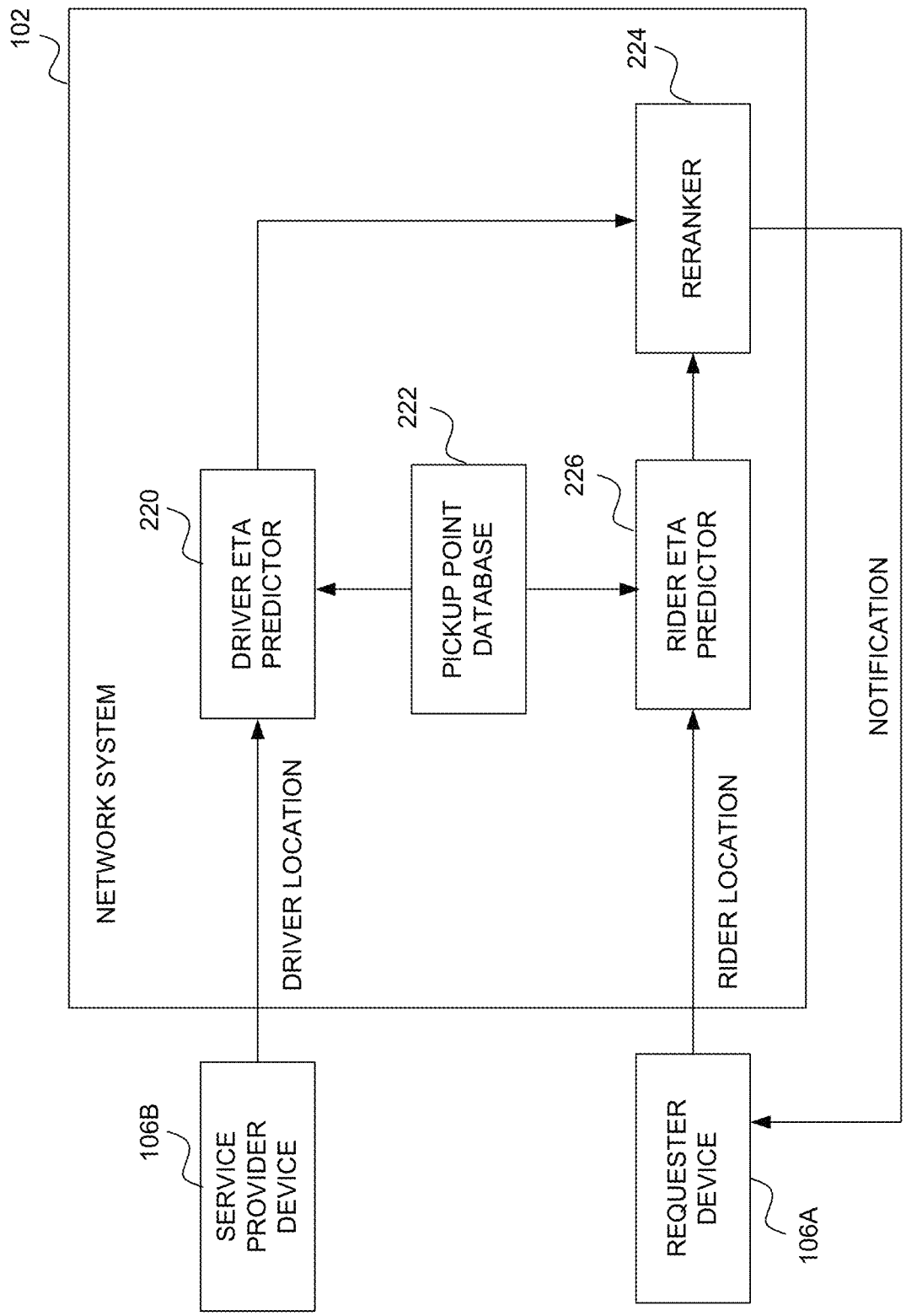
FIG. 2B is a block diagram illustrating a simplified version of the network system, according to some example embodiments.

FIG. 2B is a block diagram illustrating a simplified version of the network system 102, according to some example embodiments. The components and operations in FIG. 2B can complement the operations of the network system 102 discussed in FIG. 2A. As illustrated, driver location is received from the service provider device 106b and provided to a driver ETA predictor 220. The driver ETA predictor 220 accesses historic pickup points from a pickup point database 222 to calculate driver ETA to each pickup point candidate. A driver distance to each pickup point candidate, ETA to each pickup point candidate, and routeline predictions to each pickup point candidate is then provided to the pickup point reranker 224.

Similarly, rider location is received from the requester device 106a and provided to a rider ETA predictor 226. The rider ETA predictor 226 accesses historic pickup points from a pickup point database 222 to calculate rider ETA to each pickup point candidate. A rider distance to each pickup point candidate, ETA to each pickup point candidate, and probability the rider is on the same side of the street as the pickup point candidate is then provided to the pickup point reranker 224.

The pickup point reranker 224 applies the objective function, which ranks across rider and driver distance and estimated time of arrival (ETA) from the latest known rider and driver location to each candidate pickup point in the set, as discussed above in connection with FIG. 2A. If a better pickup point is identified by the pickup point reranker 224, a notification is transmitted to the requester device 106a that indicates a better pickup point option. In some embodiments, the driver ETA predictor 220, rider ETA predictor 226, and the reranker 224 are a part of the inference engine 212 of FIG. 2A.

Figure 3:
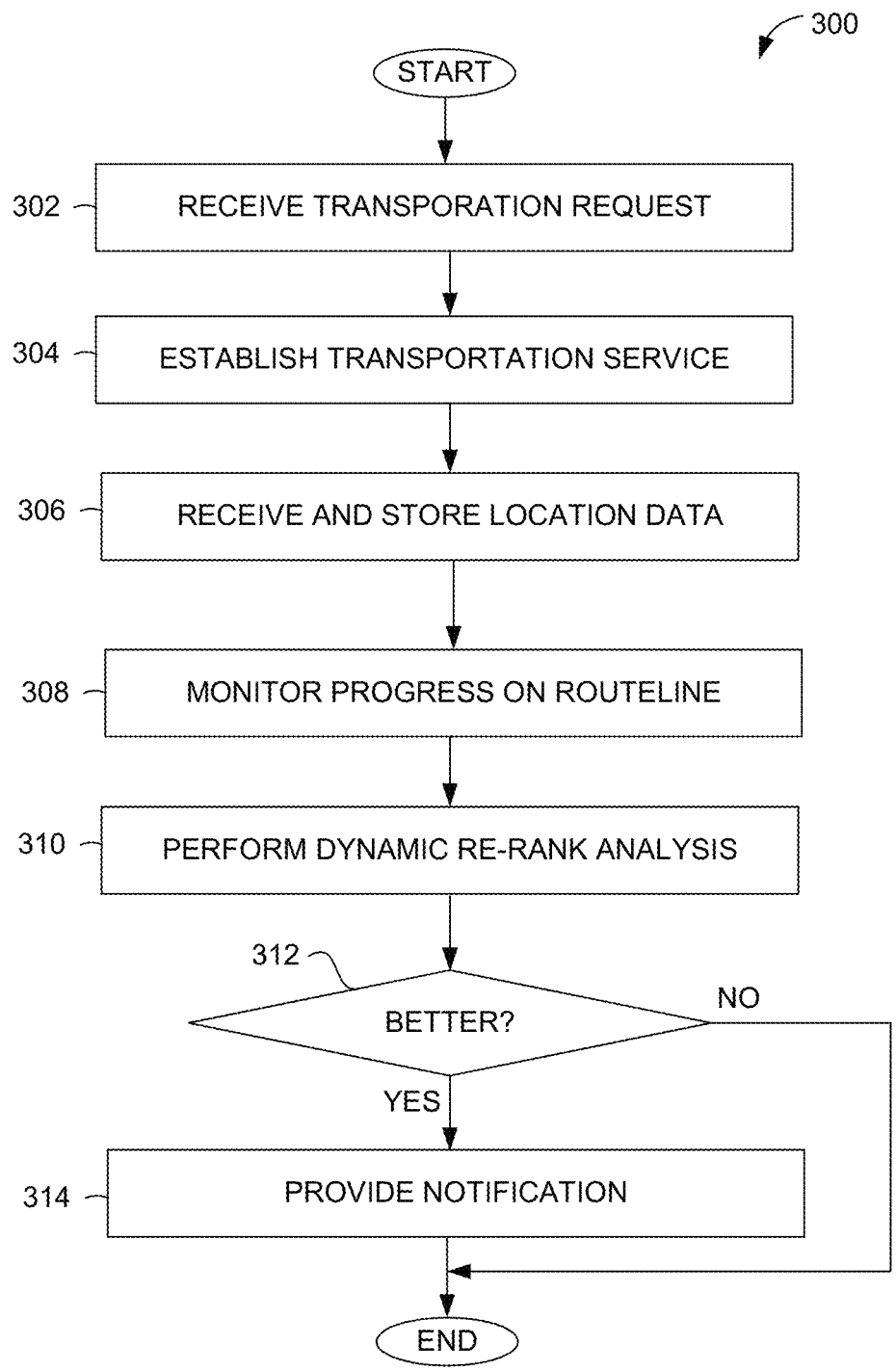
FIG. 3 is a flowchart illustrating operations of a method for dynamically re-ranking the pickup points, according to some example embodiments.

FIG. 3 is a flowchart illustrating operations of a method 300 for dynamically re-ranking pickup points, according to some example embodiments. Operations in the method 300 may be performed by the network system 102, using components described above with respect to FIG. 2A and/or FIG. 2B. Accordingly, the method 300 is described by way of example with reference to the network system 102. However, it shall be appreciated that at least some of the operations of the method 300 may be deployed on various other hardware configurations or be performed by similar components residing elsewhere in the network environment 100. Therefore, the method 300 is not intended to be limited to the network system 102.

In operation 302, the real-time API 202 receives a transportation request. The transportation request includes an initial pickup point selected by the rider (also referred to herein as "the previously-selected pickup point"). With the transportation request, location information (e.g., latitude and longitude) from the requester device 106a may also be received.

In operation 304, the service engine 206 establishes the transportation service based on the transportation request. In example embodiments, the service engine 206 creates a transportation job. The service engine 206 also identifies and assigns a service provider or driver to the transportation job. A driver routeline to navigate the driver from their current location to the pickup point is generated (e.g., by a navigation system of the service engine 206) and transmitted to the service provider device 106b of the assigned driver. Furthermore, a state of the job is transmitted by the service engine 206 to the state aggregator 208.

Post request, while the rider is waiting for pickup, the API 202 receives location information from both the requester device 106a and the service provider device 106b in operation 306. The location information from the rider may indicate that the rider is at the pickup point, walking to the pickup point, is in a wrong location (e.g., not at the pickup point), or heading away from the pickup point. The location information from the driver indicates a current or last known location of the driver. In some cases, a speed and direction that the driver is traveling is also received or inferred from the location information. The location information for the rider and driver is stored to the location store 204.

In operation 308, the network system 102 monitors progress on the predicted driver routeline. In one embodiment, the routeline is determined by the navigation system associated with the service engine 206 and comprises a route from a current location of the driver to the assigned pickup point. Based on the location information received from the service provider device 106b, the network system 102 (e.g., the service engine 206) can determine whether the driver has deviated from the driver routeline in accordance with one embodiment. Alternatively, other monitoring mechanisms of the network system 102 monitor whether the driver is following a given routeline.

In operation 310, the inference engine 212 performs dynamic re-rank analysis using the location information. The inference engine 212 only performs the dynamic re-rank analysis when the current state of the job is pre-pickup. As such, in example embodiments, the inference engine 212 first determines, based on a current state of the job accessed from the state aggregator 208, that the job is in a pre-pickup state before performing the re-ranking analysis.

In some embodiments, operation 310 occurs continuously. In other embodiments, operation 310 is triggered by an event. For example, operation 310 can be triggered if the network system 102 detects that the driver has deviated from the predicted driver routeline and a new driver routeline needs to be generated; if the driver has driven past the rider at the previously-selected pickup point; or if the rider will likely not be at the previously-selected pickup point by an ETA of arrival by the driver (e.g., rider is walking too slow, rider is in the wrong location, rider is heading in a wrong direction). Operation 310 is discussed in more detail in connection with FIG. 4 below.

In operation 312, a determination is made, based on the re-ranking analysis, whether a candidate pickup point is better than a current pickup point (i.e., the previously-selected pickup point). The determination is based on results of an objective function applied to a set of candidate pickup points and the previously-selected pickup point. In some embodiments, operation 312 is a part of the operation 310. That is, the determination whether the candidate pickup point is better is performed as part of the re-rank analysis.

If the result of top-ranking candidate pickup point exceeds the result of the previously-selected pickup point by more than a predetermined threshold, then the inference engine 212 triggers the notification module 214 to generate and provide a notification presenting the top-ranking candidate pickup point as an alternative pickup point in operation 314. The notification is then transmitted to the requester device 106a. In one embodiment, the notification is a push notification. In other embodiments, the notification may comprise a text message or an in-application experience.

In a further embodiment, the inference engine 212 may review historical data for the rider to determine whether to send the notification. For example, if the rider never changes the pickup point at a particular location, then the inference engine 212 may not trigger the notification module 214 to generate and present the notification.

Should the rider accept an option to change the pickup point to the alternative pickup point, the pickup point is updated for both the rider and driver on their respective user device 106. In some embodiments, the driver may receive a technical re-route but without direction changes (e.g., no looping around a block). The drive may, in some cases, also receive a notification that the rider has changed the pickup point.

While the method. 300 illustrates the dynamically re-ranking analysis being performed once, in some embodiments, the analysis may occur multiple times. As a result, upon completion of operation 312 (when the candidate pickup point is not better) or operation 314 (when the candidate pickup point is better), the method 300 can return to operation 306 where the location data continues to be received from the rider and driver and operations 306-314 repeated until pickup occurs (e.g., current state=pickup completed).

Figure 4:
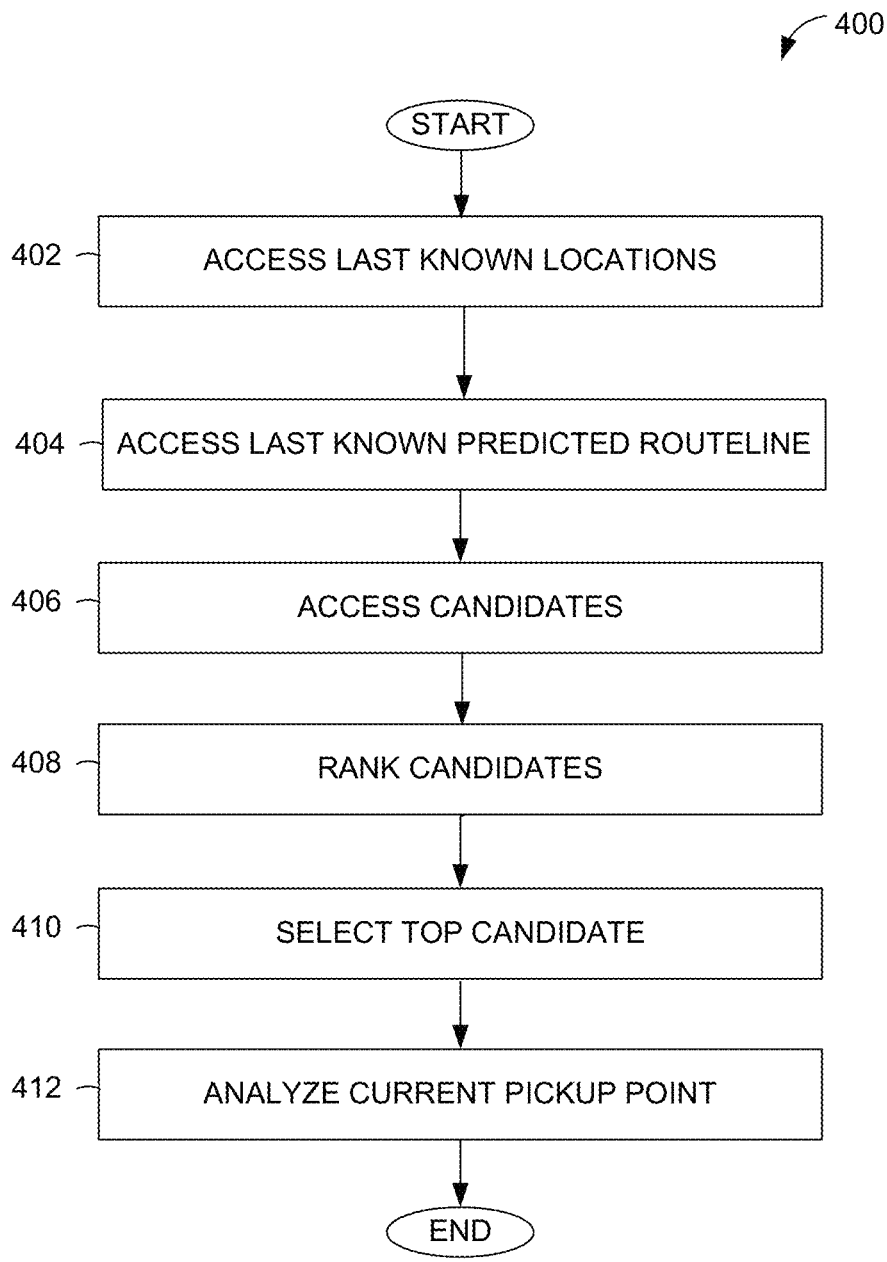
FIG. 4 is a flowchart illustrating operations of a method for performing re-ranking analysis, according to some example embodiments.

FIG. 4 is a flowchart illustrating operations of a method 400 (e.g., operation 310) for performing re-ranking analysis, according to some example embodiments. Operations in the method 400 may be performed by the network system 102 (e.g., inference engine 212), using components described above with respect to FIG. 2A and/or FIG. 2B. Accordingly, the method 400 is described by way of example with reference to the network system 102. However, it shall be appreciated that at least some of the operations of the method 400 may be deployed on various other hardware configurations or be performed by similar components residing elsewhere in the network environment 100. Therefore, the method 400 is not intended to be limited to the network system 102.

In operation 402, the inference engine 212 accesses the last known locations of the rider and driver. In some embodiments, the last known locations may be smoothed by the smoothing module 210 before being accessed (e.g., received, retrieved) by the inference engine 212. In other embodiments, the last known locations are accessed from the location store 204.

In operation 404, the inference engine 212 accesses the last known predicted driver routeline. In example embodiments, the last known predicted driver routeline is accessed from the location store 204 or from the service engine 206 depending on where the network system 102 stores the predicted driver routeline.

In operation 406, the inference engine 212 accesses a set of candidate pickup points or hotspots. In example embodiments, the set of candidate pickup points is determined or obtained by making a call to a component that stores hotspots determined based on historical trip data. In one embodiment, the set of candidate pickup points is stored (or associated with) the service engine 206. The call includes an indication of the last known location of the rider along with a request for the hotspots within a predetermined distance (e.g., 100 meters) of the last known location of the rider.

In operation 408, the inference engine 212 ranks the set of candidate pickup points. More specifically, using the last known rider and driver locations, predicted driver routeline, current traffic conditions, and set of candidate pickup points, the inference engine 212 applies an objective function. In various embodiments, the objective function ranks across rider and driver estimated time of arrival (ETA) from the latest known rider and driver location to each candidate pickup point in the set. In this example, the objective function is based 50% on the rider ETA to the candidate location and 50% on the driver ETA to the candidate location. In another embodiment, the objective function also includes the Euclidean distance between the rider location and candidate point, and between the driver location and the candidate point, with all four attributes weighted equally at 25%.

In another embodiment, the objective function also incorporates the distance from each candidate pickup point to the predicted driver routeline and whether the candidate pickup point is on a same side of the street as the rider. Thus, the objective function is a weighted function of the last known rider location, last known driver location, and predicted driver routeline. In one example, the objective function is based on 25% on the distance of each candidate from the current routeline, 25% on whether the candidate is on the same side of street as the rider, and 50% on the ETA between the rider's location and the candidate point.

In operation 410, the inference engine 212 selects the top-ranked candidate pickup point. For example, the top-ranked candidate pickup point is the pickup point with the lowest ETA for the driver. In a further embodiment, the inference engine 212 can select more than one top-ranked candidate pickup point in order to provide more than one alternative option.

In operation 412, the inference engine 212 analyzes the current pickup point. In example embodiments, the inference engine 212 applies the same objective function as that used for the set of candidate pickup points to the current pickup point. The inference engine 212 then compares the result of the current pickup point to the result of the top-ranked candidate pickup point (e.g., operation 312) to determine whether the top-ranked pickup point or points should be suggested as an alternative pickup location to the rider.

Figure 5B:
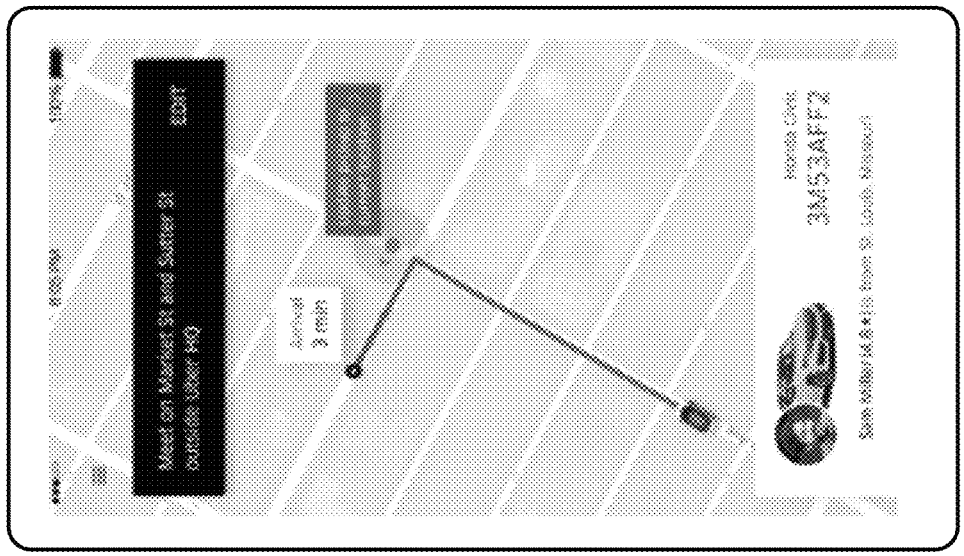
FIGS. 5A-5C are example screenshots of different user interfaces for providing dynamically re-ranked pickup point notifications.
Figure 5A:
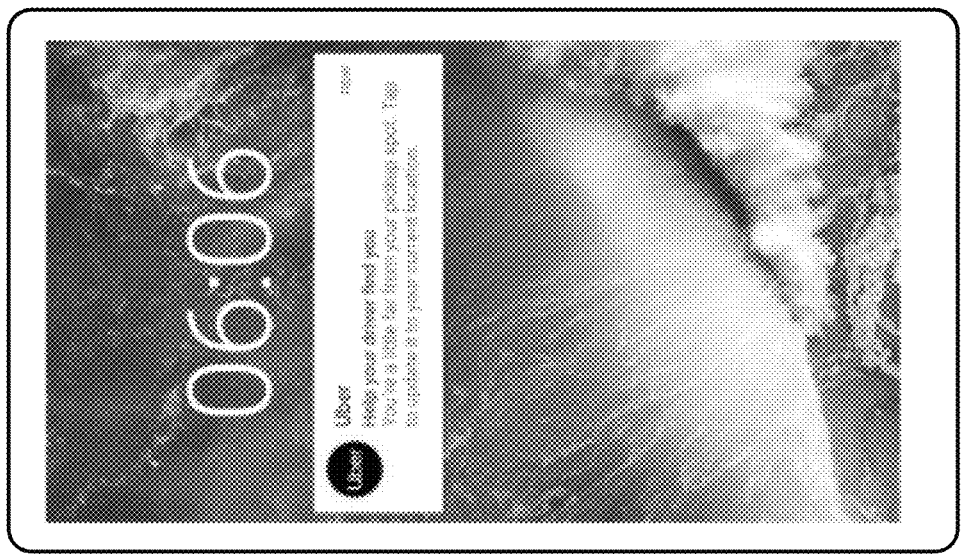
Figure 5C:
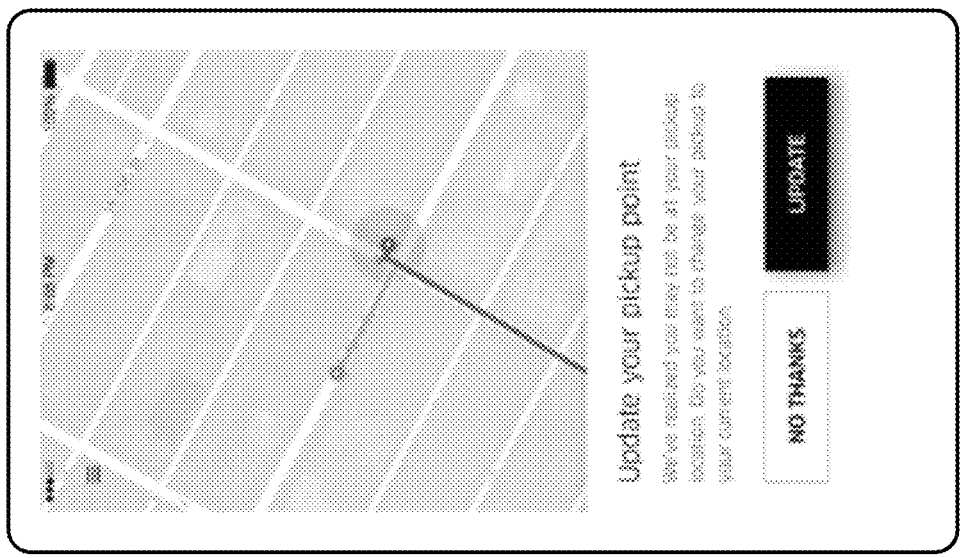

FIGS. 5A-5C are example screenshots of different user interfaces for providing dynamically re-ranked pickup point notifications. Each of the user interfaces provides the notification generated in operation 314 when a candidate pickup point has a better objective function result than the current pickup point.

FIG. 5A illustrates a screenshot that is provided on the requester device 106a when the client application 108 is not open. As shown, the notification is presented on a lock screen of the requester device 106a. In the example shown in FIG. 5A, the notification indicates that the rider is a little far from the pickup point and that the rider can change the pickup point to their current location.

FIG. 5B illustrates a screenshot of a user interface that is provided within the client application 108. As shown, the notification provided in FIG. 5B suggests that the rider update the pickup point to their current location by tapping on the current location shown on the user interface.

FIG. 5C illustrates a screenshot of another user interface that can be provided within the client application 108. In this example, a message is provided at a bottom of the user interface indicating that the rider is not at the pickup location and asking if the rider would like to update the pickup point to their current location. The rider can then tap on a selection to either not update the pickup location (e.g., "No Thanks" selection) or to update the pickup location (e.g., "Update" selection).

While the examples of FIGS. 5A-5C show notifications indicating that the rider is not at the previously-selected pickup point, other notifications can be generated and transmitted to the requester device 106a. For example, the notification can indicate that the rider can save time if they travel to a different pickup point. For instance, the notification can state "Save 3 minutes by walking 1 block over" or "Save $2 by crossing the street." These textual notifications can also be supplemented with a visual indication on a map of the alternative pickup point. In an embodiment where the driver missed the previously-selected pickup point, the notification may indicate, for example, "Your Driver missed the pickup point. Select a new place to walk or wait X min for your Driver to come back around." Other examples may also include, for example, "Traffic is getting worse for your driver to pick you up. Would you like to walk X minutes in order to reach your destination Y minutes sooner?" or "We found a better pickup point. Would you like to get picked up on X street and save Y minutes to your destination?"

Additionally, while example embodiments discuss the re-ranking analysis occurring at the network system 102, alternative embodiments contemplate the requester device 106a performing the re-ranking analysis. For example, a version of the inference engine 212 may be incorporated into the client application 108. During runtime, the requester device 106a makes calls to the network system 102 to obtain driver location information, predicted driver routeline, and candidate pickup points. The requester device 106a can then perform the re-ranking analysis with the retrieved information. Any change in pickup point can then be reported to the network system 102 and the corresponding driver updated (e.g., with new routeline to alternative pickup point).

In a further embodiment, traffic data can also be taken into consideration in the re-ranking analysis. For example, traffic data within a predetermined distance of the previously-selected pickup point can be accessed by the inference engine 212. The traffic data can then be a further component in the objective function. For instance, the objective function may be based on 70% last known rider location, 10% last known driver location, 10% predicted driver routeline, and 10% traffic data. A result may indicate, for example, that if the rider walks two blocks to right, the rider can save time (e.g., ETA for arrival of the driver at the alternate pickup point will be 5 minutes shorter).

In yet other embodiments, other sensors on the requester device 106a can provide data that is used to determine whether an alternative pickup point should be presented to the rider. In one embodiment, a step counter can indicate if the rider is walking around. If the rider is not walking, this signals that the rider is waiting and the network system 102 can determine if the rider is waiting in the wrong location (e.g., not at the previously-selected pickup point). In another embodiment, if a GPS sensor indicates there are no satellites above the rider, the network system 102 infers that the rider is indoors, which signifies that the rider is not waiting at the previously-selected pickup point. In one embodiment, sensor data from these sensors is received and stored to the location store 204.

Figure 6:
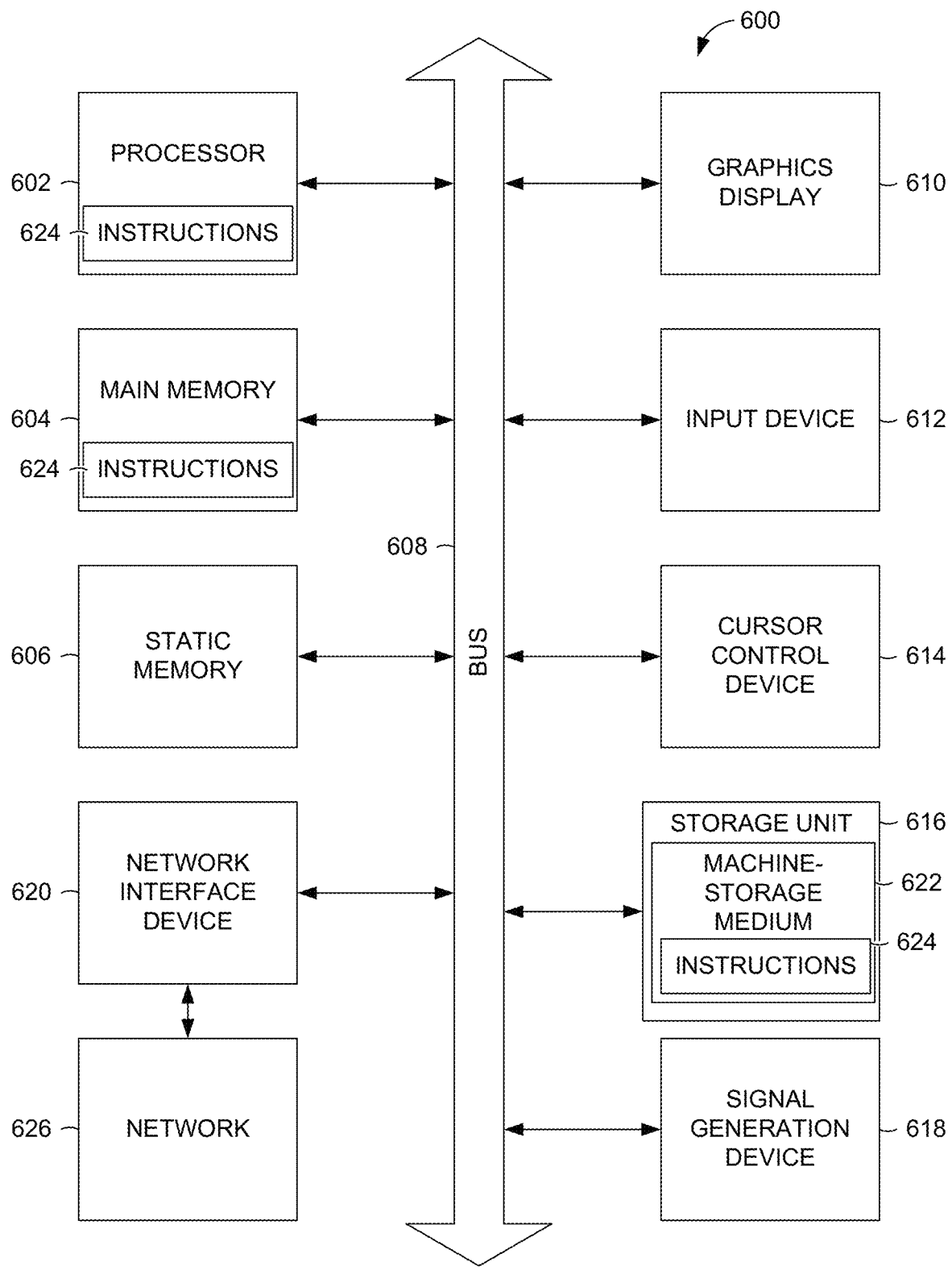
FIG. 6 is a block diagram illustrating components of a machine, according to some example embodiments, able to read instructions from a machine-readable medium and perform any one or more of the methodologies discussed herein.

FIG. 6 illustrates components of a machine 600, according to some example embodiments, that is able to read instructions from a machine-storage medium (e.g., a machine-readable storage device, a non-transitory machine-readable storage medium, a computer-readable storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIG. 3 and FIG. 4. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-storage medium 622 (e.g., a tangible machine-readable storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-readable media (e.g., tangible and non-transitory machine-readable media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Examples

Example 1 is a method for dynamically re-ranking a pickup point of a transportation service. The method comprises receiving, by a network system, a request for transportation service from a device of a rider, the request including a selected pickup point; establishing, by the network system, the transportation service, the establishing including assigning a driver to the transportation service; detecting, by a hardware processor of the network system, that the transportation service is in a pre-pickup state; performing, based on the transportation service being in a pre-pickup state, a re-rank analysis, the re-rank analysis determining whether an alternative pickup point exceeds the selected pickup point on an objective function by more than a predetermined threshold, the determining being based on a last known location of the rider, a last known location of the driver, and a predicted driver routeline; and responsive to the alternative pickup point exceeding the selected pickup point on the objective function by more than the predetermined threshold, causing presentation, on a device of the rider, of a suggestion to change to the alternative pickup point.

In example 2, the subject matter of example 1 can optionally include monitoring a device of the driver; based on the monitoring, detecting that the driver has deviated from the predicted driver routeline; and in response to detecting the driver has deviated, generating a new driver routeline, wherein the performing the re-rank analysis is based on the new driver routeline replacing the predicted driver routeline.

In example 3, the subject matter of any of examples 1-2 can optionally include monitoring the device of the rider; and based on the monitoring, detecting that the rider will not be at the selected pickup point by an estimate time of arrival (ETA) of the driver, wherein the performing the re-rank analysis is triggered by the detecting that the rider will not be at the selected pickup point by the ETA.

In example 4, the subject matter of any of examples 1-3 can optionally include detecting that the driver has driven passed the rider at the selected pickup point; and in response to detecting the driver has driven passed the rider, generating a new driver routeline, wherein the performing the re-rank analysis is based on the new driver routeline replacing the predicted driver routeline.

In example 5, the subject matter of any of examples 1-4 can optionally include receiving an indication of acceptance of the alternative pickup point; and in response to receiving the indication, updating the driver routeline to the alternative pickup point.

In example 6, the subject matter of any of examples 1-5 can optionally include wherein the performing the re-rank analysis comprises accessing a set of candidate pickup points within a threshold distance of the last known location of the rider, the alternative pickup point being a top-ranked pickup point from the set of candidate pickup points based on the objective function.

In example 7, the subject matter of any of examples 1-6 can optionally include wherein the determining whether the alternative pickup point exceeds the selected pickup point is further based on traffic data within a predetermined distance of the selected pickup point.

In example 8, the subject matter of any of examples 1-7 can optionally include wherein the causing presentation of the suggestion comprises providing a notification that the rider can save time if the rider walks to the alternative pickup point.

In example 9, the subject matter of any of examples 1-8 can optionally include wherein the causing presentation of the suggestion comprises providing a visual indication on a map of the alternative pickup point.

In example 10, the subject matter of any of examples 1-9 can optionally include wherein the causing presentation of the suggestion comprises providing a notification that the driver missed the selected pickup point and providing an option to walk to the alternative pickup point or wait.

Example 11 is a system to dynamically re-rank a pickup point of a transportation service. The system comprises one or more hardware processors and a memory storing instructions that, when executed by the one or more hardware processors, cause the one or more hardware processors to perform operations comprising receiving a request for transportation service from a device of a rider, the request including a selected pickup point; establishing the transportation service, the establishing including assigning a driver to the transportation service; detecting that the transportation service is in a pre-pickup state; performing, based on the transportation service being in a pre-pickup state, a re-rank analysis, the re-rank analysis determining whether an alternative pickup point exceeds the selected pickup point on an objective function by more than a predetermined threshold, the determining being based on a last known location of the rider, a last known location of the driver, and a predicted driver routeline; and responsive to the alternative pickup point exceeding the selected pickup point on the objective function by more than the predetermined threshold, causing presentation, on a device of the rider, of a suggestion to change to the alternative pickup point.

In example 12, the subject matter of example 11 can optionally include wherein the operations further comprise monitoring a device of the driver; based on the monitoring, detecting that the driver has deviated from the predicted driver routeline; and in response to detecting the driver has deviated, generating a new driver routeline, wherein the performing the re-rank analysis is based on the new driver routeline replacing the predicted driver routeline.

In example 13, the subject matter of any of examples 11-12 can optionally include wherein the operations further comprise monitoring the device of the rider; and based on the monitoring, detecting that the rider will not be at the selected pickup point by an estimate time of arrival (ETA) of the driver, wherein the performing the re-rank analysis is triggered by the detecting that the rider will not be at the selected pickup point by the ETA.

In example 14, the subject matter of any of examples 11-13 can optionally include wherein the operations further comprise detecting that the driver has driven passed the rider at the selected pickup point; and in response to detecting the driver has driven passed the rider, generating a new driver routeline, wherein the performing the re-rank analysis is based on the new driver routeline replacing the predicted driver routeline.

In example 15, the subject matter of any of examples 11-14 can optionally include wherein the operations further comprise receiving an indication of acceptance of the alternative pickup point; and in response to receiving the indication, updating the driver routeline to the alternative pickup point.

In example 16, the subject matter of any of examples 11-15 can optionally include wherein the performing the re-rank analysis comprises accessing a set of candidate pickup points within a threshold distance of the last known location of the rider, the alternative pickup point being a top-ranked pickup point from the set of candidate pickup points based on the objective function.

In example 17, the subject matter of any of examples 11-16 can optionally include wherein the determining whether the alternative pickup point exceeds the selected pickup point is further based on traffic data within a predetermined distance of the selected pickup point.

In example 18, the subject matter of any of examples 11-17 can optionally include wherein the causing presentation of the suggestion comprises providing a notification that the rider can save time if the rider walks to the alternative pickup point.

In example 19, the subject matter of any of examples 11-18 can optionally include wherein the causing presentation of the suggestion comprises providing a visual indication on a map of the alternative pickup point.

Example 20 is a machine-storage medium comprising instructions which, when executed by one or more hardware processors of a machine, cause the machine to perform operations to dynamically re-rank a pickup point of a transportation service. The operations comprise receiving a request for transportation service from a device of a rider, the request including a selected pickup point; establishing the transportation service, the establishing including assigning a driver to the transportation service; detecting that the transportation service is in a pre-pickup state; performing, based on the transportation service being in a pre-pickup state, a re-rank analysis, the re-rank analysis determining whether an alternative pickup point exceeds the selected pickup point on an objective function by more than a predetermined threshold, the determining being based on a last known location of the rider, a last known location of the driver, and a predicted driver routeline; and responsive to the alternative pickup point exceeding the selected pickup point on the objective function by more than the predetermined threshold, causing presentation, on a device of the rider, of a suggestion to change to the alternative pickup point.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving, by a network system, a request for transportation service from a device of a rider, the request including a selected pickup point;
establishing, by the network system, the transportation service, the establishing including assigning a driver to the transportation service and transmitting, to the driver, a predicted driver routeline to navigate the driver to the selected pickup point;
after establishing the transportation service, detecting, by a hardware processor of the network system, that a current state of the transportation service is in a pre-pickup state in which the driver is assigned and traveling to the selected pickup point;
in response to detecting that the transportation service is in the pre-pickup state in which the driver is assigned and traveling to the selected pickup point, performing a re-rank analysis to determine whether an alternative pickup point exceeds the selected pickup point on an objective function by more than a predetermined threshold, the objective function being a weighted function of a last known location of the rider, a last known location of the driver, and the predicted driver routeline and based in part on whether the alternative pickup point is on a same side of the street as the rider; and
responsive to the alternative pickup point exceeding the selected pickup point on the objective function by more than the predetermined threshold, causing presentation, on a device of the rider, of a suggestion to change to the alternative pickup point.

2. The method of claim 1, further comprising:
monitoring a device of the driver;
based on the monitoring, detecting that the driver has deviated from the predicted driver routeline; and
in response to detecting the driver has deviated, generating a new driver routeline, wherein the performing the re-rank analysis is further based on the new driver routeline replacing the predicted driver routeline.

3. The method of claim 1, further comprising:
monitoring the device of the rider; and
based on the monitoring, detecting that the rider will not be at the selected pickup point by an estimate time of arrival (ETA) of the driver, wherein the performing the re-rank analysis is further based on the detecting that the rider will not be at the selected pickup point by the ETA.

4. The method of claim 1, further comprising:
detecting that the driver has driven passed the rider at the selected pickup point; and
in response to detecting the driver has driven passed the rider, generating a new driver routeline, wherein the performing the re-rank analysis is further based on the new driver routeline replacing the predicted driver routeline.

5. The method of claim 1, further comprising:
receiving an indication of acceptance of the alternative pickup point; and
in response to receiving the indication, updating the predicted driver routeline to the alternative pickup point.

6. The method of claim 1, wherein the performing the re-rank analysis comprises accessing a set of candidate pickup points within a threshold distance of the last known location of the rider, the alternative pickup point being a top-ranked pickup point from the set of candidate pickup points based on the objective function.

7. The method of claim 1, wherein the objective function is further based on traffic data within a predetermined distance of the selected pickup point.

8. The method of claim 1, wherein the causing presentation of the suggestion comprises providing a notification that the rider can save time if the rider walks to the alternative pickup point.

9. The method of claim 1, wherein the causing presentation of the suggestion comprises providing a visual indication on a map of the alternative pickup point.

10. The method of claim 1, wherein the causing presentation of the suggestion comprises providing a notification that the driver missed the selected pickup point and providing an option to walk to the alternative pickup point or wait.

11. A system comprising:
one or more hardware processors; and
memory storing instructions that, when executed by the one or more hardware processors, cause the one or more hardware processors to perform operations comprising:
receiving a request for transportation service from a device of a rider, the request including a selected pickup point;
establishing the transportation service, the establishing including assigning a driver to the transportation service and transmitting to the driver, a predicted driver routeline to navigate the driver to the selected pickup point;
after establishing the transportation service, detecting that the current state of the transportation service is in a pre-pickup state in which the driver is assigned and traveling to the selected pickup point:
in response to detecting that the transportation service is in the pre-pickup state in which the driver is assigned and traveling to the selected pickup point, performing a re-rank analysis to determine whether an alternative pickup point exceeds the selected pickup point on an objective function by more than a predetermined threshold, the objective function being a weighted function of a last known location of the rider, a last known location of the driver, and a predicted driver routeline and based in part on whether the alternative pickup point is on a same side of the street as the rider; and
responsive to the alternative pickup point exceeding the selected pickup point on the objective function by more than the predetermined threshold, causing presentation, on a device of the rider, of a suggestion to change to the alternative pickup point.

12. The system of claim 11, wherein the operations further comprise:
monitoring a device of the driver;
based on the monitoring, detecting that the driver has deviated from the predicted driver routeline; and
in response to detecting the driver has deviated, generating a new driver routeline, wherein the performing the re-rank analysis is further based on the new driver routeline replacing the predicted driver routeline.

13. The system of claim 11, wherein the operations further comprise:
monitoring the device of the rider; and
based on the monitoring, detecting that the rider will not be at the selected pickup point by an estimate time of arrival (ETA) of the driver, wherein the performing the re-rank analysis is further based on the detecting that the rider will not be at the selected pickup point by the ETA.

14. The system of claim 11, wherein the operations further comprise:
detecting that the driver has driven passed the rider at the selected pickup point; and
in response to detecting the driver has driven passed the rider, generating a new driver routeline, wherein the performing the re-rank analysis is further based on the new driver routeline replacing the predicted driver routeline.

15. The system of claim 11, wherein the operations further comprise:
receiving an indication of acceptance of the alternative pickup point; and
in response to receiving the indication, updating the predicted driver routeline to the alternative pickup point.

16. The system of claim 11, wherein the performing the re-rank analysis comprises accessing a set of candidate pickup points within a threshold distance of the last known location of the rider, the alternative pickup point being a top-ranked pickup point from the set of candidate pickup points based on the objective function.

17. The system of claim 11, wherein the objective function is further based on traffic data within a predetermined distance of the selected pickup point.

18. The system of claim 11, wherein the causing presentation of the suggestion comprises providing a notification that the rider can save time if the rider walks to the alternative pickup point.

19. The system of claim 11, wherein the causing presentation of the suggestion comprises providing a visual indication on a map of the alternative pickup point.

20. A machine-storage medium storing instructions that, when executed by one or more hardware processors of a machine, cause the machine to perform operations comprising:
receiving a request for transportation service from a device of a rider, the request including a selected pickup point;
establishing the transportation service, the establishing including assigning a driver to the transportation service and transmitting, to the driver a driver routeline to navigate the driver to the selected pickup point;
after establishing the transportation service, detecting that a current state of the transportation service is in a pre-pickup state in which the driver is assigned and traveling to the selected pickup point;
in response to detecting that the transportation service is in a pre-pickup state in which the driver is assigned and traveling to the selected pickup point, performing a re-rank analysis to determine whether an alternative pickup point exceeds the selected pickup point on an objective function by more than a predetermined threshold, the objective function being a weighted function of a last known location of the rider, a last known location of the driver, and a predicted driver routeline and based in part on whether the alternative pickup point is on a same side of the street as the rider; and responsive to the alternative pickup point exceeding the selected pickup point on the objective function by more than the predetermined threshold, causing presentation, on a device of the rider, of a suggestion to change to the alternative pickup point.

\* \* \* \* \*